(12) United States Patent
Pompei (10) Patent No.: US 10,126,173 B2
(45) Date of Patent: *Nov. 13, 2018

(54) INFRARED SENSOR AND METHOD FOR ELECTRICAL MONITORING

(71) Applicant: Exergen Corporation, Watertown, MA (US)

(72) Inventor: Francesco Pompei, Watertown, MA (US)

(73) Assignee: Exergen Corporation, Watertown, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/697,290

(22) Filed: Sep. 6, 2017

(65) Prior Publication Data

US 2017/0363474 A1 Dec. 21, 2017

Related U.S. Application Data

(63) Continuation of application No. 14/921,358, filed on Oct. 23, 2015, now Pat. No. 9,759,609, which is a
(Continued)

(51) Int. Cl.
*G01J 5/00* (2006.01)
*G01K 7/02* (2006.01)
(Continued)

(52) U.S. Cl.
CPC ............. *G01J 5/00* (2013.01); *G01J 5/0066* (2013.01); *G01J 5/0096* (2013.01); *G01J 5/04* (2013.01);
(Continued)

(58) Field of Classification Search
CPC .... G01J 5/08; G01J 5/0066; G01J 5/04; G01J 5/0096; G01J 5/089; G01J 5/16; G01J 5/046; G01J 2005/0048
(Continued)

(56) References Cited

U.S. PATENT DOCUMENTS 2,199,082 A 4/1940 Peters
4,874,253 A 10/1989 Pompei et al.
(Continued)

FOREIGN PATENT DOCUMENTS

WO WO 2012/092424 7/2012

OTHER PUBLICATIONS

International Preliminary Report on Patentability from International Application No. PCT/US2011/067720, titled "Infrared Sensor and Method for Electrical Monitoring," dated Jul. 11, 2013.
(Continued)

*Primary Examiner* — Lisa Caputo
*Assistant Examiner* — Janice M Soto
(74) *Attorney, Agent, or Firm* — Hamilton, Brook, Smith & Reynolds, P.C.

(57) ABSTRACT

An inexpensive thermopile temperature detector is particularly adapted to monitoring of electrical equipment, such as a power bus bar, within an enclosed area such as a cabinet. The detector may have a plastic housing, a thermopile sensor and a plastic Fresnel lens. Each sensor also includes a calibrated element such that, but for calibration, the same sensor may be used for various applications for different target sizes and distance or, more generally, with respect to effective target percentage of field of view.

14 Claims, 9 Drawing Sheets

Related U.S. Application Data continuation of application No. 13/339,566, filed on Dec. 29, 2011, now Pat. No. 9,170,158.

(60) Provisional application No. 61/428,649, filed on Dec. 30, 2010.

(51) Int. Cl.
 *G01J 5/04* (2006.01)
 *G01J 5/08* (2006.01)
 *G01J 5/16* (2006.01)

(52) U.S. Cl.
 CPC ............... *G01J 5/046* (2013.01); *G01J 5/08* (2013.01); *G01J 5/089* (2013.01); *G01J 5/16* (2013.01); *G01K 7/02* (2013.01); *G01J 2005/0048* (2013.01)

(58) Field of Classification Search
 USPC ............................. 374/1, 179, 120–121, 129
 See application file for complete search history.

(56) References Cited

U.S. PATENT DOCUMENTS

| | | | | |
|---|---|---|---|---|
| 5,229,612 A | * | 7/1993 | Pompei | G01J 5/14 250/338.1 |
| 5,319,202 A | * | 6/1994 | Pompei | G01J 5/14 250/252.1 |
| 5,333,784 A | * | 8/1994 | Pompei | G01J 5/04 236/91 C |
| 6,048,093 A | * | 4/2000 | Pompei | G01J 5/04 250/349 |
| 6,280,081 B1 | | 8/2001 | Blau et al. | |
| 9,170,158 B2 | | 10/2015 | Pompei | |
| 9,759,609 B2 | | 12/2017 | Pompei | |
| 2002/0037026 A1 | * | 3/2002 | Sato | G01J 5/02 374/132 |
| 2003/0001096 A1 | | 1/2003 | Pompei | |
| 2003/0065467 A1 | | 4/2003 | Schuh et al. | |
| 2003/0147449 A1 | | 8/2003 | Chavan | |
| 2005/0201444 A1 | | 9/2005 | Hollander et al. | |
| 2010/0060450 A1 | | 3/2010 | Jorgensen | |

OTHER PUBLICATIONS

Lahiji, G.R., et al. "A Batch-Fabricated Silicon Thermopile Infrared Detector", IEE Trans. Elec. Dev., ED-29(1): 14-22 (1982).

Notification of Transmittal of the International Search Report and the Written Opinion of the International Searching Authority, of the Declaration, dated Apr. 5, 2012 for International Application No. PCT/US2011/067720, titled "Infrared Sensor and Method for Electrical Monitoring,".

Omega Engineering, Inc. Omega Complete Temperature Measurement Handbook and Encyclopedia 1992, vol. 28, p. J-34.

Pompei, et al., "Hunting Mighty Milliwatts," Qhi-Group, Exergen Corporation 7×24 Exchange, 34 slides (Jun. 5, 2006).

Pompei, et al., "Hunting the Mighty Milliwatts—The Next Technology Step," Presented for 7×24 Exchange National Conference Orlando Florida, 8 pages (Jun. 2006).

\* cited by examiner

| cm | Dist/spot | | | | | | | | | | | |
|---|---|---|---|---|---|---|---|---|---|---|---|---|
| | Busbar size | | | | | | | | | | | |
| Distance | 2 | 3 | 4 | 5 | 6 | 7 | 8 | 9 | 10 | 11 | 12 | |
| 3 | 1.50 | 1.00 | 0.75 | 0.60 | 0.50 | 0.43 | 0.38 | | | | | |
| 4.15 | 2.08 | 1.38 | 1.04 | 0.83 | 0.69 | 0.59 | 0.52 | | | | | |
| 5 | 2.50 | 1.67 | 1.25 | 1.00 | 0.83 | 0.71 | 0.63 | | | | | |
| 5.9 | 2.95 | 1.97 | 1.48 | 1.18 | 0.98 | 0.84 | 0.74 | | | | | |
| 7 | 3.50 | 2.33 | 1.75 | 1.40 | 1.17 | 1.00 | 0.88 | | | | | |
| 8 | 4.00 | 2.67 | 2.00 | 1.60 | 1.33 | 1.14 | 1.00 | 0.89 | 0.80 | 0.73 | 0.67 | |
| 9 | 4.50 | 3.00 | 2.25 | 1.80 | 1.50 | 1.29 | 1.13 | 1.00 | 0.90 | 0.82 | 0.75 | |
| 10 | 5.00 | 3.33 | 2.50 | 2.00 | 1.67 | 1.43 | 1.25 | 1.11 | 1.00 | 0.91 | 0.83 | |
| 11 | 5.50 | 3.67 | 2.75 | 2.20 | 1.83 | 1.57 | 1.38 | 1.22 | 1.10 | 1.00 | 0.92 | |
| 12 | 6.00 | 4.00 | 3.00 | 2.40 | 2.00 | 1.71 | 1.50 | 1.33 | 1.20 | 1.09 | 1.00 | |
| 13 | 6.50 | 4.33 | 3.25 | 2.60 | 2.17 | 1.86 | 1.63 | 1.44 | 1.30 | 1.18 | 1.08 | |
| 14 | 7.00 | 4.67 | 3.50 | 2.80 | 2.33 | 2.00 | 1.75 | 1.56 | 1.40 | 1.27 | 1.17 | |
| 15 | | 5.00 | 3.75 | 3.00 | 2.50 | 2.14 | 1.88 | 1.67 | 1.50 | 1.36 | 1.25 | |
| 16 | | 5.33 | 4.00 | 3.20 | 2.67 | 2.29 | 2.00 | 1.78 | 1.60 | 1.45 | 1.33 | |
| 17 | | 5.67 | 4.25 | 3.40 | 2.83 | 2.43 | 2.13 | 1.89 | 1.70 | 1.55 | 1.42 | |
| 18 | | 6.00 | 4.50 | 3.60 | 3.00 | 2.57 | 2.25 | 2.00 | 1.80 | 1.64 | 1.50 | |
| 19 | | 6.33 | 4.75 | 3.80 | 3.17 | 2.71 | 2.38 | 2.11 | 1.90 | 1.73 | 1.58 | |
| 20 | | 6.67 | 5.00 | 4.00 | 3.33 | 2.86 | 2.50 | 2.22 | 2.00 | 1.82 | 1.67 | |
| 21 | | 7.00 | 5.25 | 4.20 | 3.50 | 3.00 | 2.63 | 2.33 | 2.10 | 1.91 | 1.75 | |
| 22 | | | 5.50 | 4.40 | 3.67 | 3.14 | 2.75 | 2.44 | 2.20 | 2.00 | 1.83 | |
| 24 | | | 6.00 | 4.80 | 4.00 | 3.43 | 3.00 | 2.67 | 2.40 | 2.18 | 2.00 | |
| 26 | | | 6.50 | 5.20 | 4.33 | 3.71 | 3.25 | 2.89 | 2.60 | 2.36 | 2.17 | |
| 28 | | | 7.00 | 5.60 | 4.67 | 4.00 | 3.50 | 3.11 | 2.80 | 2.55 | 2.33 | |
| 30 | | | | 6.00 | 5.00 | 4.29 | 3.75 | 3.33 | 3.00 | 2.73 | 2.50 | |
| 32 | | | | 6.40 | 5.33 | 4.57 | 4.00 | 3.56 | 3.20 | 2.91 | 2.67 | |
| 34 | | | | 6.80 | 5.67 | 4.86 | 4.25 | 3.78 | 3.40 | 3.09 | 2.83 | |
| 36 | | | | | 6.00 | 5.14 | 4.50 | 4.00 | 3.60 | 3.27 | 3.00 | |
| 38 | | | | | 6.33 | 5.43 | 4.75 | 4.22 | 3.80 | 3.45 | 3.17 | |

*FIG. 10*

| cm | % signal | | calibration= | 1.8 | | | | | | | | |
|---|---|---|---|---|---|---|---|---|---|---|---|---|
| | Busbar size | | | | | | | | | | | |
| Distance | 2 | 3 | 4 | 5 | 6 | 7 | 8 | 9 | 10 | 11 | 12 | |
| 3 | 104% | 110% | 114% | 116% | 118% | 119% | 120% | | | | | |
| 4.15 | 97% | 105% | 110% | 113% | 115% | 116% | 117% | | | | | |
| 5 | 92% | 102% | 107% | 110% | 113% | 115% | 116% | | | | | |
| 5.9 | 87% | 98% | 104% | 108% | 111% | 113% | 114% | | | | | |
| 7 | 82% | 94% | 101% | 105% | 108% | 110% | 112% | | | | | |
| 8 | 77% | 90% | 98% | 102% | 106% | 109% | 110% | 112% | 113% | 114% | 115% | |
| 9 | 74% | 86% | 95% | 100% | 104% | 107% | 109% | 110% | 112% | 113% | 114% | |
| 10 | 70% | 83% | 92% | 98% | 102% | 105% | 107% | 109% | 110% | 112% | 113% | |
| 11 | 68% | 80% | 89% | 95% | 100% | 103% | 105% | 107% | 109% | 110% | 112% | |
| 12 | 65% | 77% | 86% | 93% | 98% | 101% | 104% | 106% | 108% | 109% | 110% | |
| 13 | 63% | 75% | 84% | 91% | 96% | 99% | 102% | 104% | 106% | 108% | 109% | |
| 14 | 62% | 73% | 82% | 89% | 94% | 98% | 101% | 103% | 105% | 107% | 108% | |
| 15 | | 70% | 80% | 86% | 92% | 96% | 99% | 102% | 104% | 106% | 107% | |
| 16 | | 68% | 77% | 85% | 90% | 94% | 98% | 100% | 102% | 104% | 106% | |
| 17 | | 67% | 75% | 83% | 88% | 93% | 96% | 99% | 101% | 103% | 105% | |
| 18 | | 65% | 74% | 81% | 86% | 91% | 95% | 98% | 100% | 102% | 104% | |
| 19 | | 64% | 72% | 79% | 85% | 89% | 93% | 96% | 99% | 101% | 103% | |
| 20 | | 63% | 70% | 77% | 83% | 88% | 92% | 95% | 98% | 100% | 102% | |
| 21 | | 62% | 69% | 76% | 82% | 86% | 90% | 94% | 96% | 99% | 101% | |
| 22 | | | 68% | 74% | 80% | 85% | 89% | 92% | 95% | 98% | 100% | |
| 24 | | | 65% | 72% | 77% | 82% | 86% | 90% | 93% | 95% | 98% | |
| 26 | | | 63% | 69% | 75% | 80% | 84% | 88% | 91% | 93% | 96% | |
| 28 | | | 62% | 67% | 73% | 77% | 82% | 85% | 89% | 91% | 94% | |
| 30 | | | | 65% | 70% | 75% | 80% | 83% | 86% | 89% | 92% | |
| 32 | | | | 64% | 68% | 73% | 77% | 81% | 85% | 87% | 90% | |
| 34 | | | | 63% | 67% | 71% | 75% | 79% | 83% | 86% | 88% | |
| 36 | | | | | 65% | 70% | 74% | 77% | 81% | 84% | 86% | |
| 38 | | | | | 64% | 68% | 72% | 76% | 79% | 82% | 85% | |

*FIG. 11*

| cm | % signal | calibration = | optimized for +/- 5% | | | | | | | | | | Calibration |
|---|---|---|---|---|---|---|---|---|---|---|---|---|---|
| Busbar size | | | | | | | | | | | | A | 1.095 |
| Distance | 2 | 3 | 4 | 5 | 6 | 7 | 8 | 9 | 10 | 11 | 12 | B | 1.03 |
| 3 | | | | | | | | | | | | C | 1.00 |
| 4.15 | 105% | | | | | | | | | | | D | 0.99 |
| 5 | 100% | 105% | | | | | | | | | | E | 0.97 |
| 5.9 | 95% | 100% | 104% | | | | | | | | | | |
| 7 | | 96% | 101% | 105% | | | | | | | | | |
| 8 | | | 98% | 102% | 105% | | | | | | | | |
| 9 | | | 95% | 100% | 103% | | | | | | | | |
| 10 | | | 100% | 98% | 101% | 104% | | | | | | | |
| 11 | | | 97% | 95% | 99% | 102% | 104% | 104% | | | | | |
| 12 | | | | 101% | 97% | 100% | 103% | 103% | 105% | | | | |
| 13 | | | | 99% | 95% | 98% | 101% | 101% | 103% | 105% | | | |
| 14 | | | | 96% | 102% | 97% | 100% | 100% | 102% | 104% | 105% | | |
| 15 | | | | | 100% | 95% | 98% | 99% | 101% | 102% | 104% | | |
| 16 | | | | | 98% | 103% | 97% | 97% | 99% | 101% | 103% | | |
| 17 | | | | | | 96% | 101% | 95% | 96% | 98% | 100% | 102% | |
| 18 | | | | | | | 99% | 103% | 95% | 97% | 99% | 101% | |
| 19 | | | | | | | 97% | 102% | 105% | 96% | 98% | 100% | |
| 20 | | | | | | | | 96% | 100% | 103% | 95% | 97% | 99% |
| 21 | | | | | | | | | 99% | 102% | 105% | 96% | 98% |
| 22 | | | | | | | | | 97% | 101% | 104% | 95% | 97% |
| 24 | | | | | | | | | | 98% | 101% | 104% | 95% |
| 26 | | | | | | | | | | 95% | 99% | 102% | 104% |
| 28 | | | | | | | | | | | 96% | 99% | 102% |
| 30 | | | | | | | | | | | | 97% | 100% |
| 32 | | | | | | | | | | | | 95% | 98% |
| 34 | | | | | | | | | | | | | 96% |

*FIG. 12*

INFRARED SENSOR AND METHOD FOR ELECTRICAL MONITORING

RELATED APPLICATION

This application is a continuation of U.S. patent application Ser. No. 14/921,358, filed Oct. 23, 2015, which is a continuation of U.S. patent application Ser. No. 13/339,566 filed Dec. 29, 2011, U.S. Pat. No. 9,170,158, issued Oct. 27, 2015, which claims the benefit of U.S. Provisional Application No. 61/428,649, filed on Dec. 30, 2010. The entire teachings of the above applications are incorporated herein by reference.

BACKGROUND OF THE INVENTION

Over time, the repeated normal use of electrical equipment causes electrical connections to become loose and weak. The increased electrical resistance of such connections can result in heating which represents a fire hazard. The heating itself causes further increased electrical resistance and increased heating which can promptly lead to catastrophic failure. Insurance and utility companies have recommended guidelines that establish temperatures which indicate that corrective action should be taken. Infrared inspection has been used as a fast, easy and effective way of detecting electrical problems by the heat generated. Infrared inspection is safe as no contact is made with the electrical equipment. It is cost effective and accurate as the equipment is not shut down.

One form of infrared inspection is through the use of infrared thermal imaging. A less expensive approach is use of a hand-held scanner such as described in U.S. Pat. No. 4,874,253, incorporated herein by reference. Disadvantages of those test methods are that they are only carried out periodically, so there is a risk of failure between periodic checks. Continuous monitoring, particularly of critical components of the system, has been carried out using inexpensive thermopile sensors mounted to the electrical equipment. Such sensors are described in U.S. Pat. Nos. 5,229,612, 5,319,202 and 5,333,784, all incorporated herein by reference in their entireties. As disclosed in FIG. 1A of U.S. Pat. No. 5,229,612, the sensor may be a simple thermopile with a calibrating resistor, or as illustrated in FIG. 1B, it may include thermocouple leads to emulate a thermocouple sensor. To minimize electrical interference, the sensor housing is preferably of non-conductive plastic material. A plastic Fresnel lens may be utilized to enable more distant viewing such as up to 32 cm. The plastic reduces expense and the Fresnel lens reduces the thickness and thus energy absorption. Use of infrared sensors as monitors has been described by Pompei and Kennedy in "Hunting of the Mighty Milliwatt—The Next Technology Step," June 2006, and Pompei and Kennedy, "Hunting Might Milliwatts," June 2006, both of which were included in the provisional application 61/428,649 and are incorporated herein by reference in their entireties.

SUMMARY

With infrared inspection, there may be hundreds, or even a thousand infrared detectors at an installation. Accordingly, cost of each detector becomes very important. To minimize cost, a sensor should have a simple optical system. For example, a plastic lens may be used. A regular lens of plastic material would absorb too much energy, so a Fresnel lens is preferred. Unfortunately, an inexpensive plastic Fresnel lens tends to be lossy and not have sharp edges in its amplitude response moving away from the center of the lens. It is also preferred that the sensor include no electronics, which means the output signal would not have the benefit of amplification. The lack of electronics is also beneficial to avoid eddy currents in strong electromagnetic fields of the device being monitored.

In further effort to minimize cost, it is best to have a single sensor design regardless of the width of the target or distance from the target. That result has been obtained from a simple calibration method that allows different models of the same basic sensor to be used in different applications.

To meet the above goal, the method of monitoring electrical equipment may comprise providing a sensor comprising a thermopile and calibrating element. The sensor is calibrated with respect to target element size and target element distance, or more generally, calibrated with respect to effective target percentage of field of view. The sensor is positioned to view a target element of the electrical equipment, the sensor being at about ambient temperature of the target element of the electrical equipment. A voltage output of the sensor is detected to provide an indication of temperature differential between the target element of the electrical equipment and the sensor.

The target element may, for example, be a bus bar within a cabinet.

The sensor may be calibrated with respect to ratio of target distance and target width. The voltage output from the sensor may be calibrated by selecting from plural sensor models, the models calibrated with respect to different target element sizes and target distances. Alternatively, the voltage output may be calibrated by output electronics.

The sensor may further comprise a plastic housing and Fresnel lens and have copper leads therefrom, the voltage output being detected without regard to temperature of the sensor.

A temperature sensor may comprise a thermopile, a calibrating resistor adjusted to calibrate the sensor with target size and target distance, and an identifier enabling selection of the calibrating sensor based on target area and target size.

The preferred thermopile is a silicon based thermopile. The sensor may comprise a plastic housing and Fresnel lens and have copper leads therefrom.

DETAILED DESCRIPTION OF THE INVENTION

A description of example embodiments of the invention follows.

Figures 1, 2:
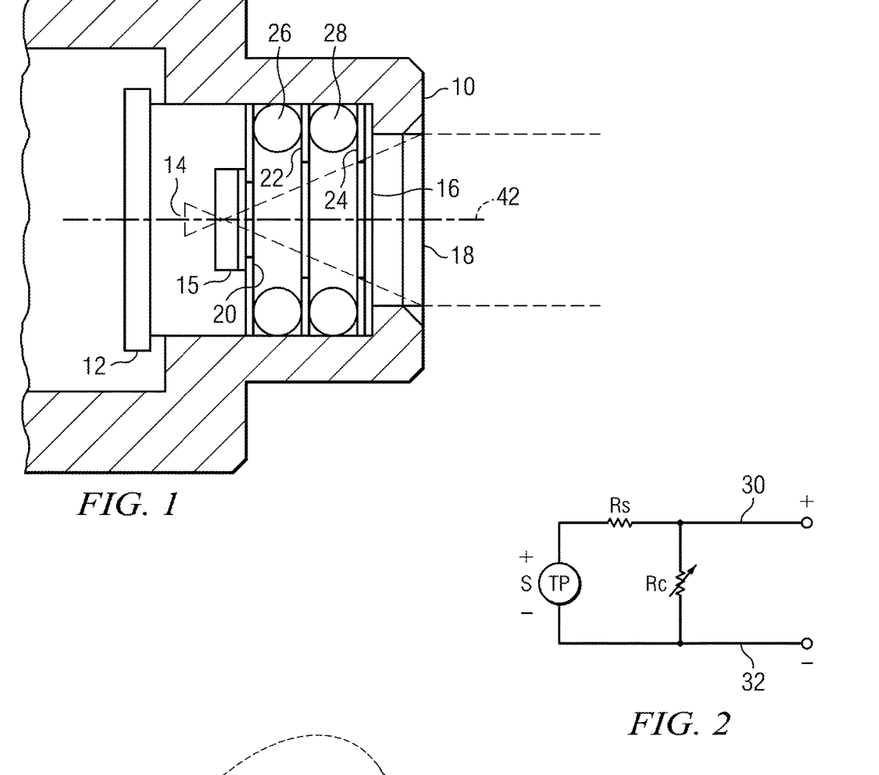
FIG. 1 is a longitudinal sectional view of a sensor used in an embodiment of the present invention.
FIG. 2 is an electrical schematic illustration of a sensor used in an embodiment of the present invention.

FIG. 1 illustrates a simple sensor that may be used in accordance with the present invention. A goal of the design is to provide an inexpensive infrared sensor to be widely used and, for example, be utilized by electrical panel manufacturers in their initial fabrication. It is preferred that there be no active electronics within the sensor. Further, the use of metal parts is minimized to reduce costs and also reduce electrical noise that results from eddy currents formed in metals parts. To that end, the sensor has a plastic housing 10. It encloses a thermopile detector can 12 of conventional design. However, unlike the more typically used thermopile of vapor deposited metal, the present design uses a less expensive silicon based thermopile 14. As is typical, the detector can include a coated silicon long-wave pass filter window 15 that flattens out the fourth power curve of the thermopile output, thus making the output more linear.

To enable viewing of targets at distances of up to, for example, 32 cm, the sensor includes a plastic Fresnel lens 16 behind the open sensor window 18. Apertures 20, 22 and 24 may be provided. The detector can 12 is pressed into the housing 10 against O rings 26 and 28 to hold the lens and any apertures in place. A centerline 42 of the optic axis of the sensor is also illustrated.

The electrical components within the sensor are illustrated in FIG. 2. The thermopile TP is represented as a voltage source which has an internal resistance represented by resistor Rs. A calibration resistor Rc is connected across the copper output leads 30 and 32. In the electrical monitoring application, it is not necessary to determine the actual temperature of the target but only the differential temperature between the target and surrounding environment. Accordingly, there is no need to account for the cold junction temperature of the thermopile as is typically done with a separate thermistor sensor or with thermocouple leads to the sensor. Less expensive copper leads may therefore be used, avoiding the expense of thermocouple wires.

At the customer site, the leads from plural sensors are typically connected to a common card that may digitize, multiplex and process the data from, for example, 8, 16 or 32 channels. The processing electronics may trigger an alarm in the event that any sensor indicates a temperature differential of, for example, 40° C. That set point is determined by the customer and is not affected by calibration other than recognition that the set point that matches the calibration voltage provides more accurate control.

Figure 3:
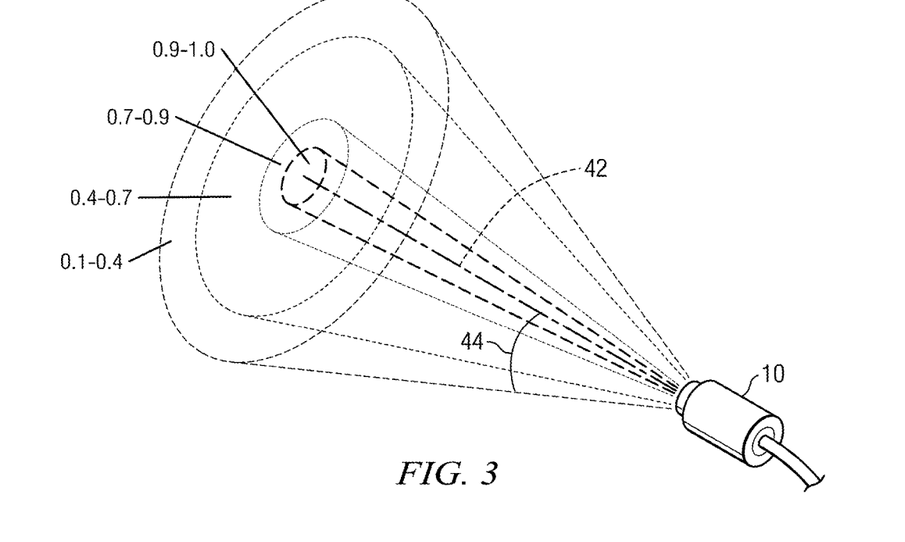
FIG. 3 illustrates the variation of sensor signal with angle from the center line of the optic axis.
Figure 4:
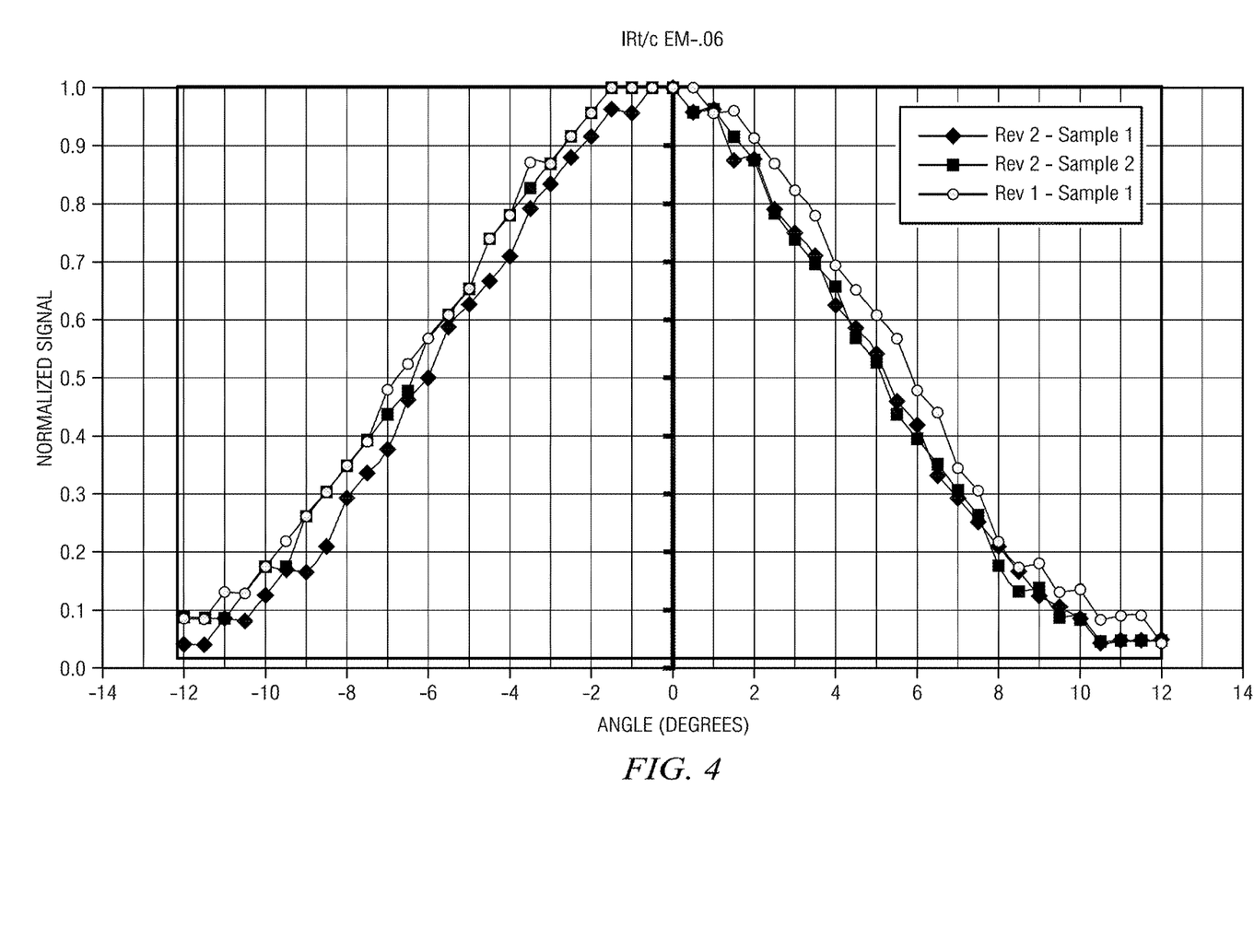
FIG. 4 illustrates the signal of the sensor of FIG. 3.

FIGS. 3 and 4 illustrate the variation in detected signal with angle 44 from the center line 42 of the optic axis of the sensor with the plastic housing 10. As can be seen in FIG. 4, near the center axis at angle θ, a full normalized signal of 1.0 is obtained. However, at greater angles, the amount of signal received reduces in accordance with a bell curve.

Figure 5:
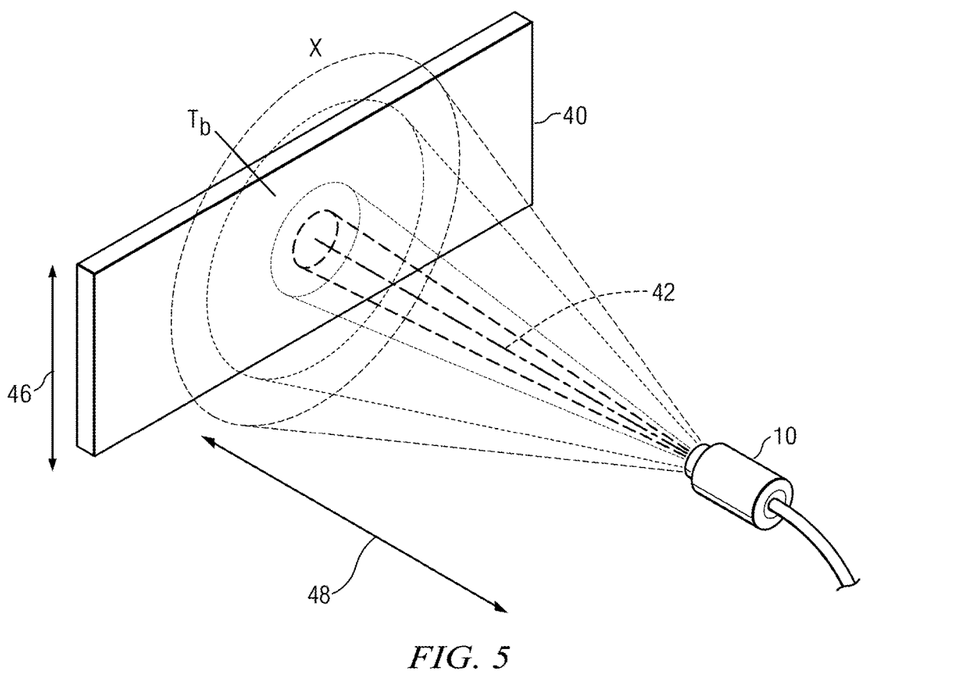
FIGS. 5 and 6 illustrate the effect of distance on the area of the target within the sensor field of view.
Figure 6:
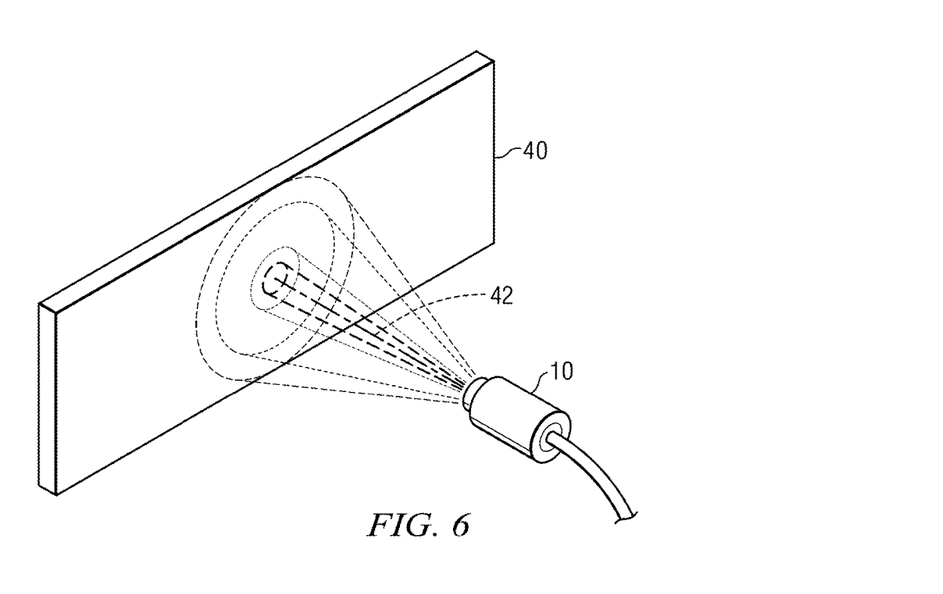

FIGS. 5 and 6 illustrate the sensor, with the plastic housing 10, viewing a particular electrical target element 10, in this case a bus bar. It can be seen from FIG. 5, that when the sensor is far from the bus bar, less energy from the bus bar and more energy from the surrounding background temperature Tb reaches the sensor. From FIG. 6, it can be seen that with the sensor closer to the bus bar, more energy from the bus bar and less energy from the surrounding background reaches the sensor. It should also be apparent that with a narrower bus bar, in either case, the energy from the bus bar would be reduced and the area from surrounding background temperature would increase.

If background area temperature is equal to the thermopile cold junction temperature, then the signal can be corrected without error by appropriate calibration for a given field of view geometry. Sensor output signal is closely approximately by $S=K*(Tt-Tcj)+(1-K)*(Tb-Tcj)$ where K is a constant, Tt is target temperature, Tcj is cold junction temperature of the thermopile and Tb is background temperature. If Tcj=Tb, then the result is $S=K*(Tt-Tcj)$ indicating temperature of the target above local background ambient, which is precisely the result desired for electrical monitoring. This result does not hold for general infrared monitoring, since you can not rely on Tb being approximately equal to Tcj when there are uncontrolled targets in the field of view area. For electrical cabinet monitoring, the electrical conductors being monitored are the heat source, with the heat generally warming the inside of the cabinet more or less uniformly. Accordingly, the sensor cold junction will warm with the cabinet ambient, thus producing an accurate reading of the target temperature rise above the conductor ambient.

The constant K in the sensor equation is related to the thermopile characteristics as well as the effective area of the target viewed by the thermopile as a portion of its full field of view. As can be seen in FIG. 5, that effective area is reduced where the field of view extends beyond the edge of the bus bar. Further, bus bars are typically painted black to increase the emissivity for more accurate readings. The length of the bus bar that is painted black determines the effective length of the bus bar as a target. Where the bus bar fills the full field of view as in FIG. 6, a higher sensor output results and calibration using resistor Rc would decrease the value of K. With a lesser effective target percentage of the field of view as illustrated in FIG. 5, the value of K with calibration would be higher. The effective percentage of the field of view can be seen to be dependent on both the target area and the distance 48 of the sensor from the target. In the case of a bus bar, area is a function of the target width 46.

Figure 7:
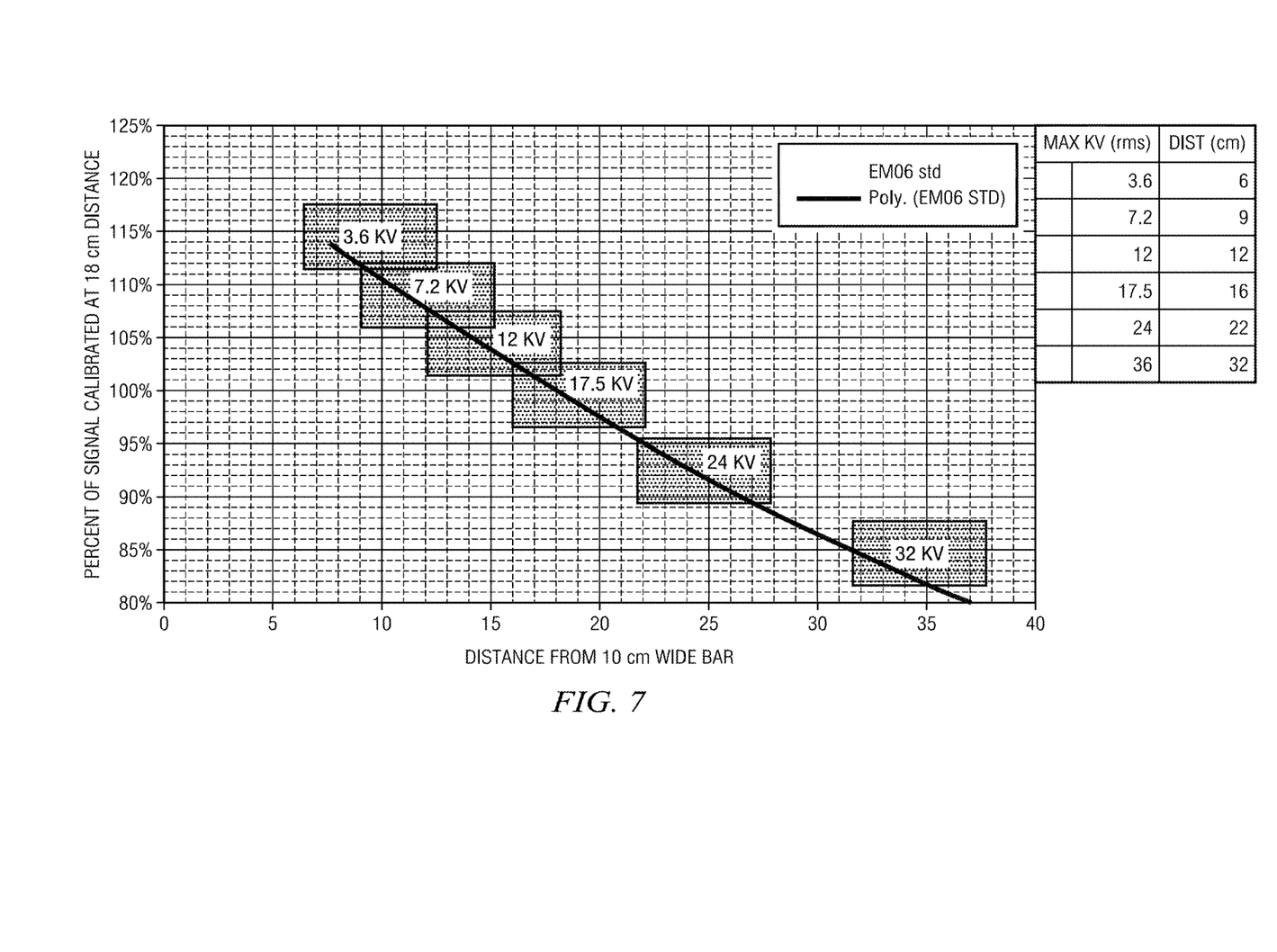
FIG. 7 is another illustration of the effect of distance on signal for a 10 cm bus bar target.

FIG. 7 illustrates the effect of distance from the target in the case of a 10 cm wide bus bar. In this case, the sensor is calibrated to provide a desired voltage output (100%) at 18 cm distance. For example, calibration might be by adjusting calibrating resistor Rc to obtain an output of 0.2 millivolts with a temperature differential between target and surrounding background of 36° C. In general, calibration voltage is selected to be a maximum that still allows for tolerances of parts of the sensor assembly.

Positioning the sensor closer to the target generally results in more accurate readings. However, with increasing voltages of the electrical equipment, increasing distances of the sensor from the target element are required. Preferred distances for different maximum voltages in kilovolts are illustrated in the table to the right of FIG. 7. It can be seen from FIG. 7 that, when the sensor has been calibrated at 18 cm distance it will result in a 100 percent of the calibrated output voltage (e.g., 0.2 mv) at that distance. As the sensor moves closer to the target, the output goes up to the percentage indicated to the left of the graph. As the distances increase, the voltages go down as indicated.

Figure 8:
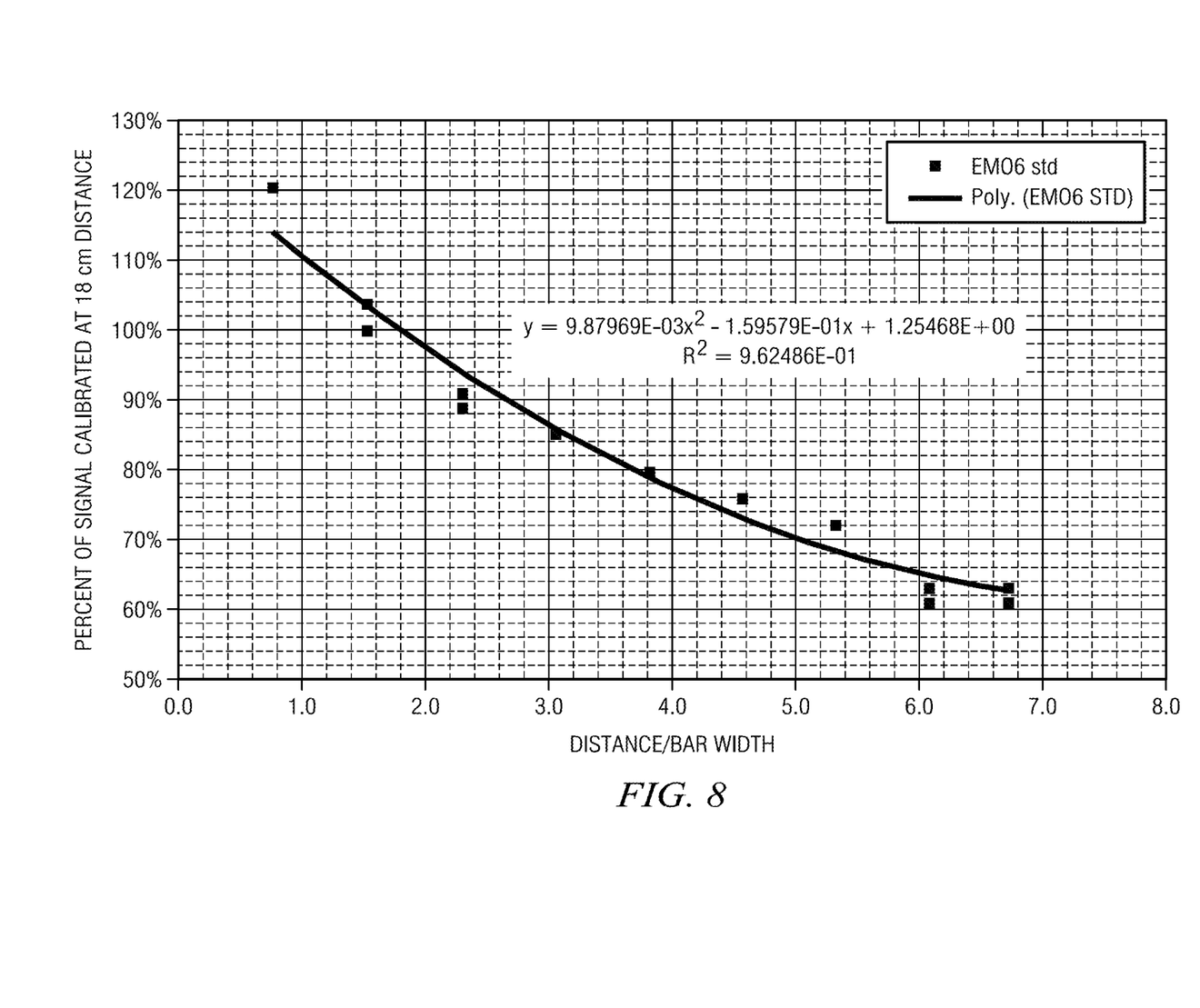
FIG. 8 illustrates the combined effect of distance and bus bar width on the output signal.

FIG. 7 is for a single bar width. The data can be generalized further with respect to different bar widths. For example, FIG. 8 illustrates data plotted against the ratio of distance to bar width where the sensor is calibrated to a desired output (100%) at a ratio of 1.8. The illustrated curve follows a least mean square fit to the data.

Figure 9:
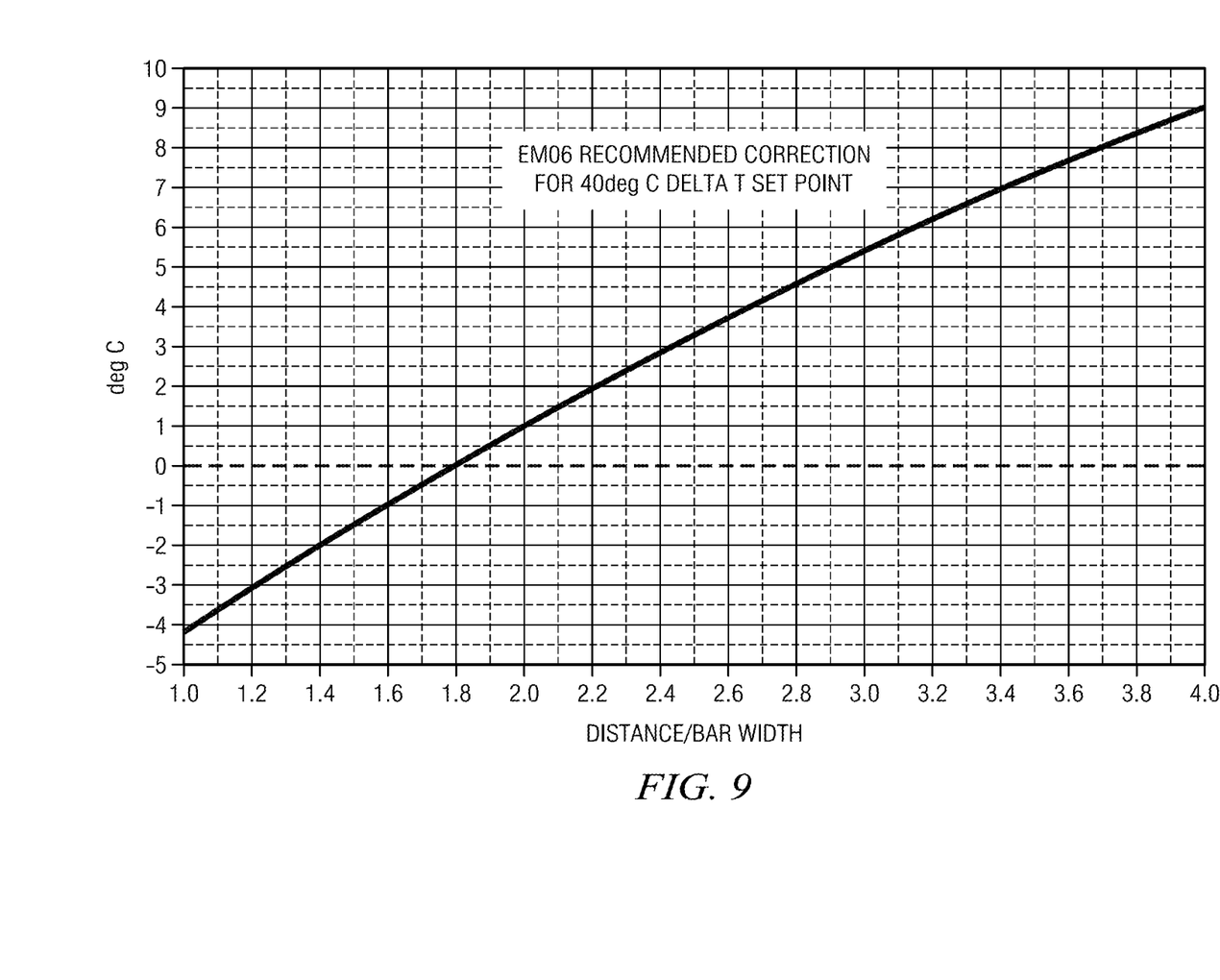
FIG. 9 illustrates the effect of distance and bus bar width on recommended temperature correction of a calibrated sensor.

FIG. 9 illustrates the changes in temperature resulting from the percentage outputs indicated in FIG. 8 for a system that triggers an output with 40° C. differential between the target and ambient. It can be seen, for example, that reducing the distance/bar width ratio to 1.0 results in an increased temperature reading of 4° C. or the need for a correction of −4° C.

Figure 10:
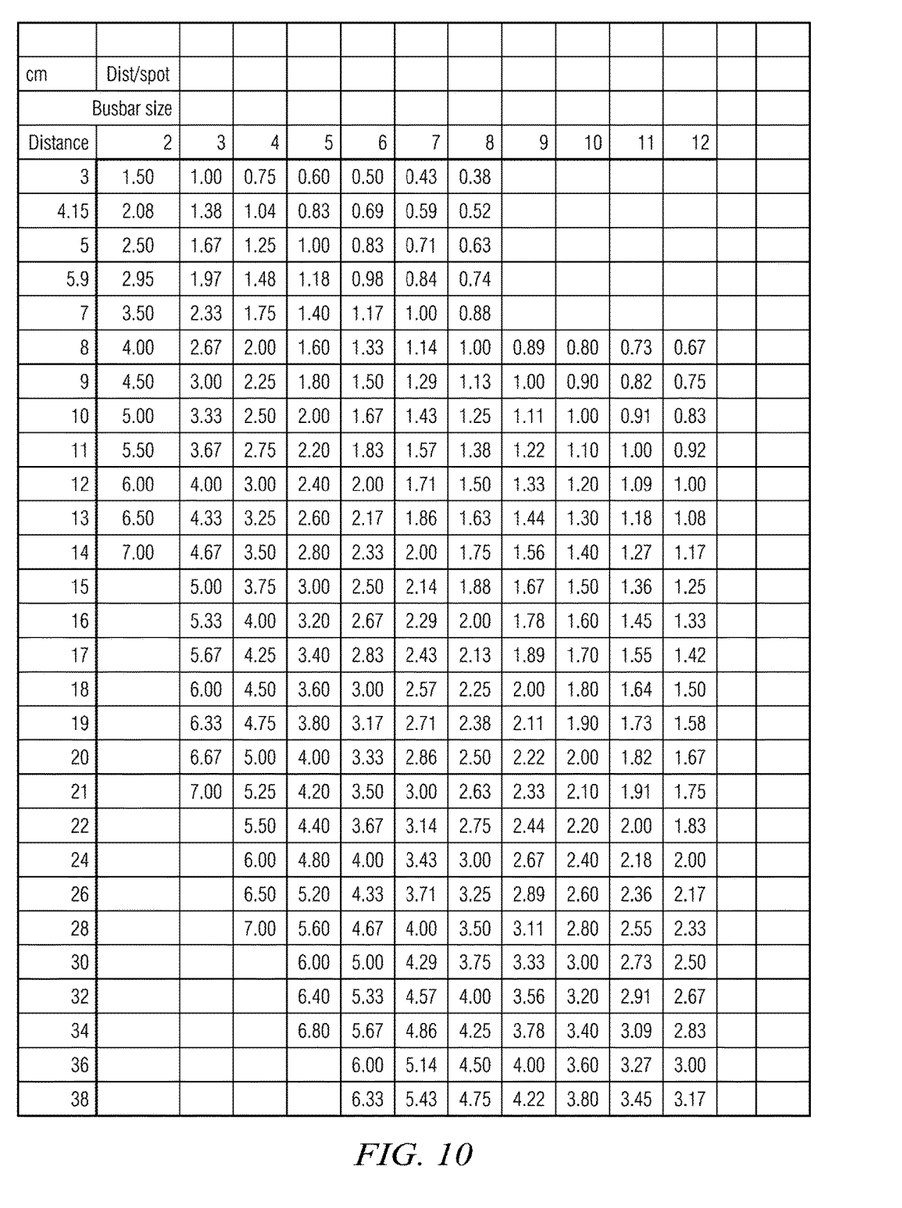
FIG. 10 provides a table of distance/bus bar width ratios for ranges of distances and bus bar widths.
Figure 11:
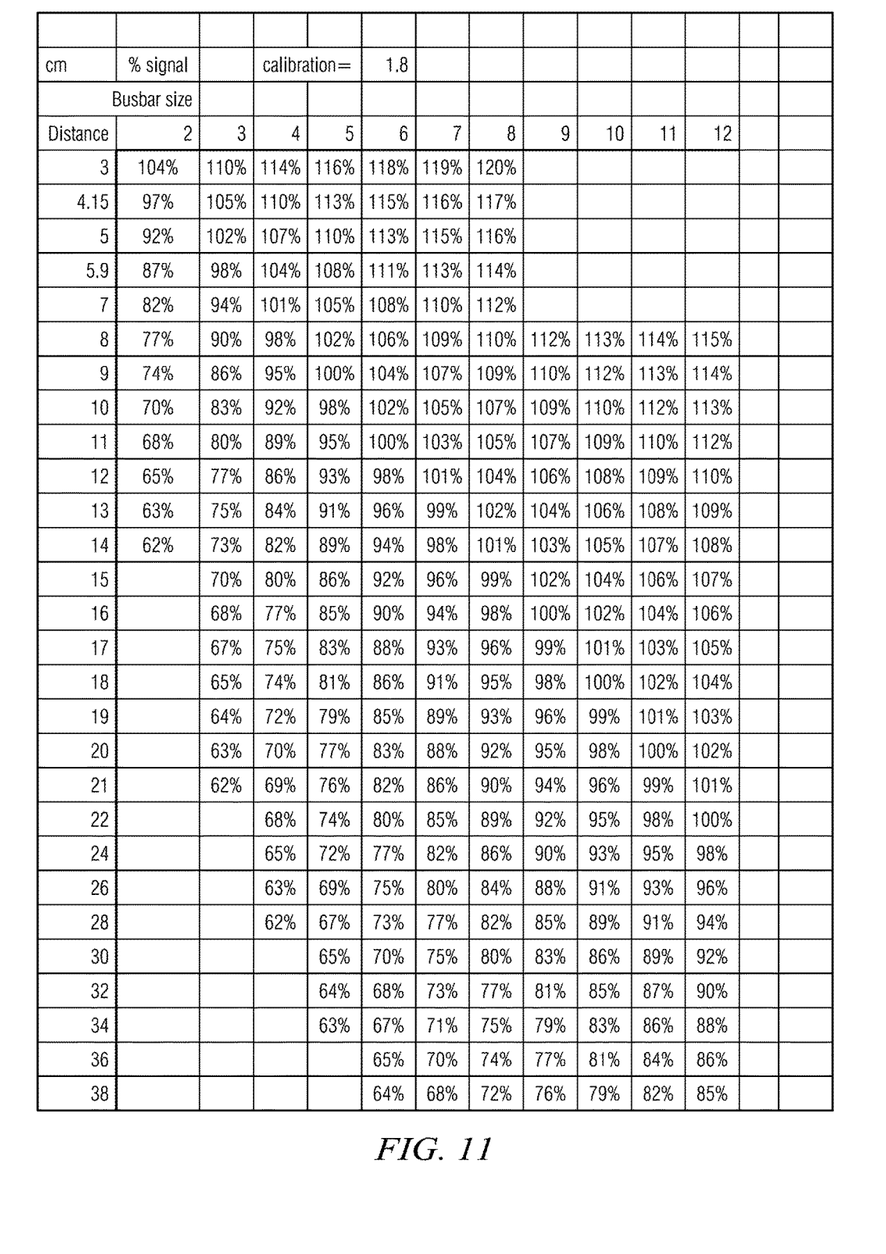
FIG. 11 is a table of percentages of calibrated output for the distances and bus bar widths for data extracted from the graph of FIG. 8.

FIG. 10 illustrates the ratios that result from various bus bar widths and distances of the sensor from the bus bar. The data of FIG. 8, taken from a limited number of test points, can be expanded to the table of FIG. 11 using the ratios of FIG. 10. FIG. 11 illustrates that a sensor calibrated for a 10 cm bus bar and a distance of 18 cm, or a ratio of 1.8, results in an output of 100% of the calibrated voltage (e.g., 0.2 millivolts). Moving closer to the target with a given bus bar width increases the signal, while moving away decreases the signal. Moving to larger bus bars increases the signal, while moving to smaller bus bars reduces the signal. It can be seen by FIG. 11 that use of a single sensor calibration can result in wide ranges of output for the wide range of applications. The indicated output ranges from 62% to 120% of the calibrated voltage.

The table of FIG. 11 illustrates the amount of additional calibration that must be performed to bring any signal to the calibrated voltage. That calibration might be performed using the table of FIG. 11 in receiving electronics that receive the voltage signal from the sensor. However, customers generally prefer not to have to meet that task. In accordance with a preferred approach, sensors of substantially identical configurations are calibrated with the resistor Rc to define different models that can be selected according to the particular distance and bus bar width required by an application. More generally, the models can be defined by effective target area percentage of field of view.

Figure 12:
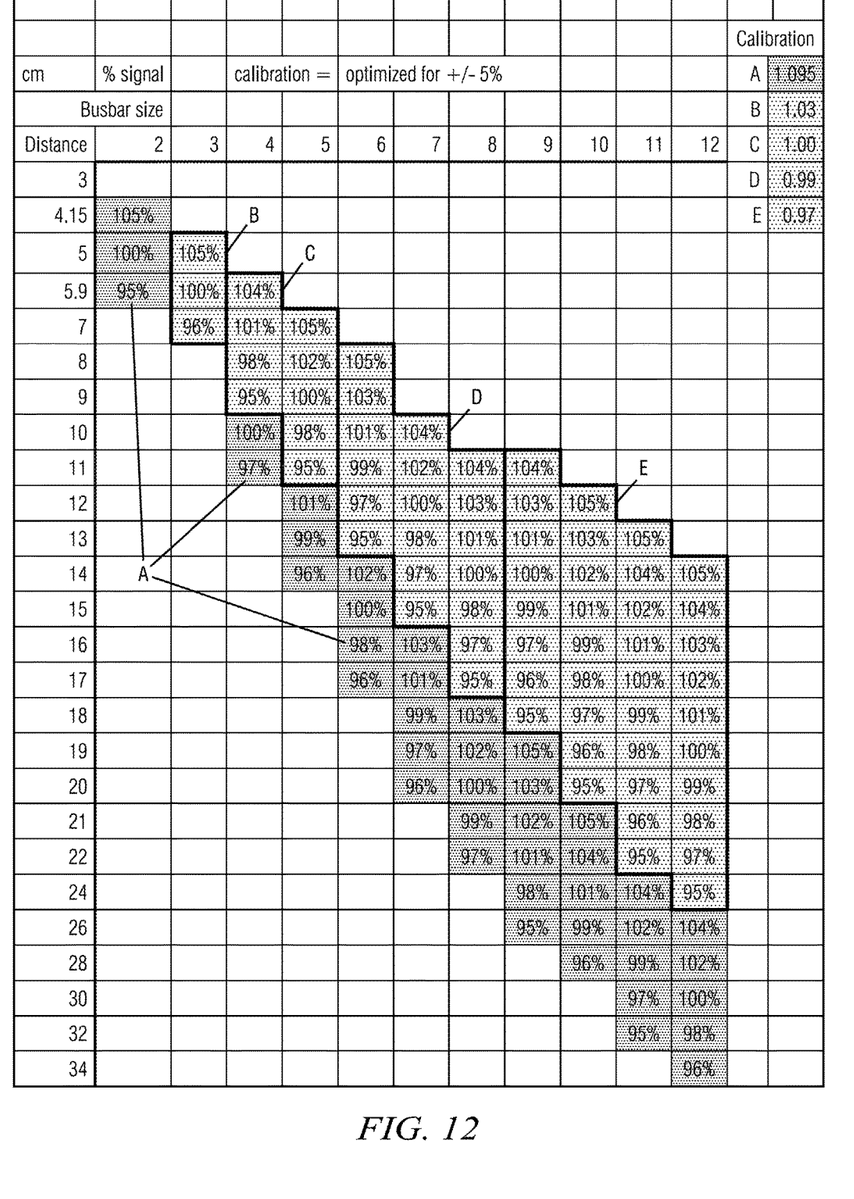
FIG. 12 illustrates five potential models of sensors having distinct calibrations for distinct ranges of distances and bus bar widths.

FIG. 12 illustrates calibration of five different models of otherwise identical devices to meet five different groupings of data to maintain all expected signals within plus or minus 5% of calibration. Here, the grouping C is calibrated at the same level as the device of FIG. 11, thus showing a calibration to the upper right of FIG. 12 at 1.0. For the other four groups, the signal output in accordance with the calibration of FIG. 11 is multiplied by the factor indicated to the upper right of FIG. 12 by increasing or decreasing Rc.

Depending on the customer's application, one of the five models is selected, thus resulting in calibration of detected voltage output of the sensor with respect to target element size and target distance. Although five different models are illustrated in FIG. 12, more or fewer models may be provided. Further, any number of other groupings of target size and distance may be used to indicate the various models. Each model would, for example, have a model number which would indicate the particular calibration of that model.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method of monitoring electrical equipment comprising:
providing a sensor comprising a thermopile;
positioning the sensor to view a target element of the electrical equipment at a target distance therefrom, a field of view of the sensor extending beyond an edge of the target element, and a cold junction of the sensor being at about a temperature of a background ambient environment surrounding the target element of the electrical equipment; and
detecting a voltage output of the sensor, calibrated for the field of view extending beyond the target element to provide an indication of temperature differential between the target element of the electrical equipment and the cold junction of the sensor.

2. The method as recited in claim 1 wherein the target element is a bus bar.

3. The method as recited in claim 1 wherein the voltage output is calibrated by output electronics.

4. The method as recited in claim 1 wherein the voltage output is calibrated by a calibrating element in the sensor.

5. The method as recited in claim 1 wherein the thermopile is a silicon based thermopile.

6. The method as recited in claim 1 wherein the sensor comprises a lens.

7. The method as recited in claim 1 wherein the sensor comprises a plastic housing and Fresnel lens and has copper leads therefrom, and voltage output is detected without regard to actual temperature of the cold junction.

8. A temperature system comprising:
a thermopile providing a voltage output, the thermopile being positioned to view a target element of electrical equipment at a target distance therefrom with a field of view extending beyond the target element and with a cold junction of the sensor at about a temperature of a background ambient environment surrounding the target element; and
a calibrating circuit electrically connected to the voltage output to calibrate the sensor for the field of view extending beyond the target element to provide an indication of temperature differential between the target element of the electrical equipment and the cold junction of the sensor.

9. The sensor as recited in claim 8 wherein the sensor is calibrated with respect to ratio of target distance and target width.

10. The sensor as recited in claim 8 wherein the thermopile is a silicon based thermopile.

11. The sensor as recited in claim 8 wherein the sensor comprises a plastic housing and Fresnel lens and has copper leads therefrom.

12. The sensor as recited in claim 8 wherein the sensor comprises a lens.

13. The sensor as recited in claim 8 wherein the calibrating circuit comprises a calibrating element integral with the thermopile.

14. The sensor as recited in claim 8 wherein the calibrating circuit comprises output electronics.

* * * * *